US012766471B2

(12) United States Patent
Congedi et al.

(10) Patent No.: US 12,766,471 B2
(45) Date of Patent: Oct. 20, 2026

(54) APPARATUS AND PROCESS FOR THE CONDITIONING OF GRANULES, POWDERS AND/OR LIQUIDS

(71) Applicant: NTE HOLDING S.R.L., Gorgonzola (IT)

(72) Inventors: Massimo Congedi, Gorgonzola (IT); Fabio Novelli, Gorgonzola (IT)

(73) Assignee: NTE HOLDING S.R.L., Gorgonzola (IT)

( * ) Notice: Subject to any disclaimer, the term of this patent is extended or adjusted under 35 U.S.C. 154(b) by 893 days.

(21) Appl. No.: 17/927,434

(22) PCT Filed: May 25, 2020

(86) PCT No.: PCT/IT2020/000041
§ 371 (c)(1),
(2) Date: Nov. 23, 2022

(87) PCT Pub. No.: WO2021/240555
PCT Pub. Date: Dec. 2, 2021

(65) Prior Publication Data
US 2023/0211297 A1 Jul. 6, 2023

(51) Int. Cl.
*B01F 23/00* (2022.01)
*B01F 23/30* (2022.01)
(Continued)

(52) U.S. Cl.
CPC .............. *B01F 23/36* (2022.01); *B01F 23/50* (2022.01); *B01F 23/60* (2022.01); *B01F 33/4062* (2022.01); *B01F 33/409* (2022.01)

(58) Field of Classification Search
CPC ..... B01F 23/36; B01F 33/409; B01F 33/4062
See application file for complete search history.

(56) References Cited

U.S. PATENT DOCUMENTS 3,159,383 A 12/1964 Van Munster
3,496,881 A * 2/1970 Simon .................. A01C 23/002
417/189

FOREIGN PATENT DOCUMENTS

JP 2012091159 A 5/2012
WO 2019003027 A1 1/2019
WO 2020261143 A1 12/2020

OTHER PUBLICATIONS

JP2012091159A to Sugiyama Machine Translation (Year: 2012).*
(Continued)

*Primary Examiner* — Anshu Bhatia
(74) *Attorney, Agent, or Firm* — SHUTTLEWORTH & INGERSOLL, PLC; Timothy J. Klima

(57) ABSTRACT

Apparatus and process for the conditioning of granules, powders and/or liquids, including: a hopper for containing the granules, powders and/or liquids equipped, on an external surface thereof, with at least one manifold defining a respective duct in fluid communication with the inside of said hopper; at least one blower member associated with said duct for delivering a flow of mixing gas or other gaseous mixing means of the granules, powders and/or liquids inside the hopper; and a first member for conditioning the flow of mixing gas arranged upstream of said blower member to adjust at least the pressure and/or humidity and/or temperature values and/or to supply the flow with an additive in a liquid or gaseous or vaporous form.

14 Claims, 2 Drawing Sheets

Figure 1:
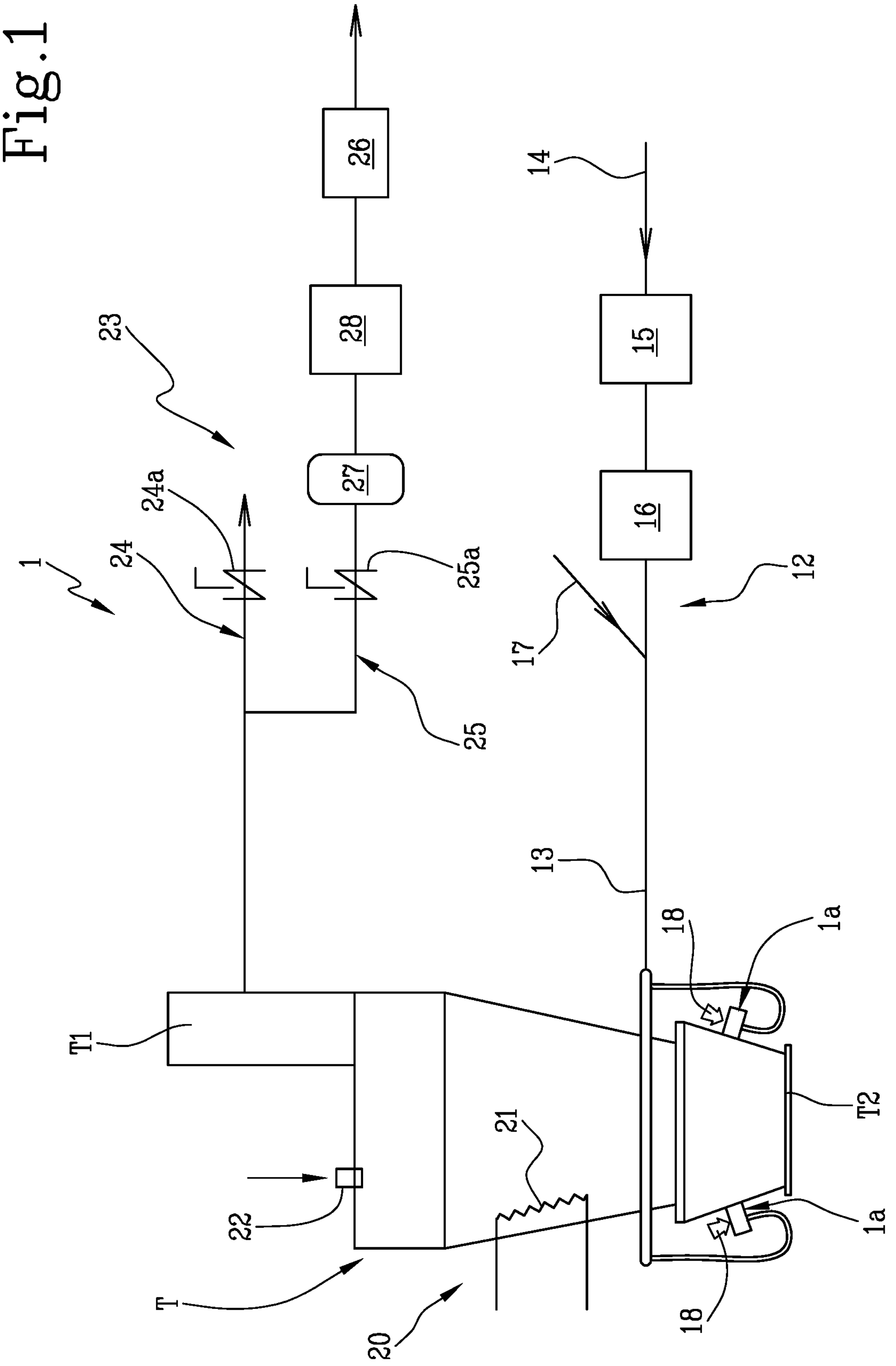

(51) Int. Cl.

| | |
|---|---|
| ***B01F 23/50*** | (2022.01) |
| ***B01F 23/60*** | (2022.01) |
| ***B01F 33/40*** | (2022.01) |

(56) References Cited

OTHER PUBLICATIONS

JP2012091159A to Sugiyama Machine Translation (Year: 212).*
International Search Report dated Apr. 12, 2021 from counterpart PCT App No. PCT/IT2020/000041.

* cited by examiner

APPARATUS AND PROCESS FOR THE CONDITIONING OF GRANULES, POWDERS AND/OR LIQUIDS

This application is the National Phase of International Application PCT/IT2020/000041 filed May 25, 2020 which designated the U.S.

The present invention falls within the scope of industrial mixers of liquids and/or granular materials, in particular powders.

In greater detail, the present invention relates to an apparatus and relative process for the conditioning of granules, powders and/or liquids.

As is well known, in the context of the treatment of various types of materials, such as in particular powders, conditioning systems are provided aimed at modifying the chemical/physical characteristics of such materials.

These operations can be of a different nature depending on the various production needs and the type of material to be treated (powders, granular or liquid material).

For example, in the specific context of the treatment of powders or granules, it may be necessary to condition the humidity level by injecting a drying or humidifying gas as a function of the result to be obtained on the product to be treated.

A further example of material conditioning may be of a chemical type, in order to add a specific substance to the material itself. Such conditioning takes place, for example in the pharmaceutical field, by distributing an active ingredient in the form of a liquid atomised on the powders. Similarly, also in the food sector, conditioning steps can be provided in which flavourings in the form of atomised liquid are supplied on food powders.

These conditioning systems are mostly implemented within treatment plants specifically dedicated to the type of conditioning that the material must undergo. Therefore, throughout the entire production line, the material is appropriately transferred to the plants adapted to operate one or more conditionings on the material.

The conditioning systems described above, although able to confer a particular chemical/physical modification on the material, nevertheless have some drawbacks.

Firstly, it should be considered that within the entire production line, the presence of appropriately dedicated conditioning systems entails major drawbacks in terms of the structural complexity of the entire line and the material transfer steps, as well as in terms of overall costs and dimensions. Further to the above, it should also be considered that the material to be treated may undergo a series of conditionings implemented in respective stations, each dedicated to a particular conditioning process. In this context, the entire plant is very complex and the material needs to be transferred from one station to another.

In addition, some conditioning operations may require very long times in order to make the desired chemical/physical modification effective. Therefore, the known conditioning systems slow down the production times of the material to be treated, with the consequent results in terms of productivity.

Moreover, reducing the time required to carry out certain conditioning operations can cause considerable problems in the quality of the product and in the effectiveness of the treatment itself.

In this regard, a further major drawback of the known conditioning systems is determined precisely by the effectiveness of some types of treatment that do not always manage to intervene on all the material to be treated.

For example, especially in the steps of treating powders through the distribution of atomised liquids, the liquid does not always manage to cover the entire amount of material. In this case, in fact, the powders are accumulated in special chambers where the atomised liquid is delivered. For this reason, only the powders at the uppermost surface are covered by the liquid jet, isolating the material underneath.

Again, a further major drawback of the conditioning systems results from the behaviour of the powders when treated with liquids or in a humid environment.

In this condition, in fact, the particles of powdered material tend to aggregate together, forming agglomerations which, in addition to compromising the quality of the final product, can damage the entire powder processing and transfer plant.

In this context, the technical task underlying the present invention is to propose an apparatus and relative process for the conditioning of granules, powders and/or liquids which overcome the drawbacks of the above-mentioned prior art.

In particular, an object of the present invention is to provide an apparatus that is structurally simple and extremely versatile in that it is able to implement different conditioning actions on materials of different nature.

In greater detail, an object of the present invention is to provide an apparatus and a process able to significantly reduce the timing of the conditioning operations, without compromising the operations themselves and the result of the final product.

A further object of the present invention is to provide an apparatus and a relative process able to condition powder or granular material in a homogeneous manner, keeping the material in the optimal production conditions.

The outlined technical task and the specified object are basically achieved by an apparatus and relative process for the conditioning of granules, powders and/or liquids, comprising the technical specifications set out in one or more of the appended claims.

Figure 2:
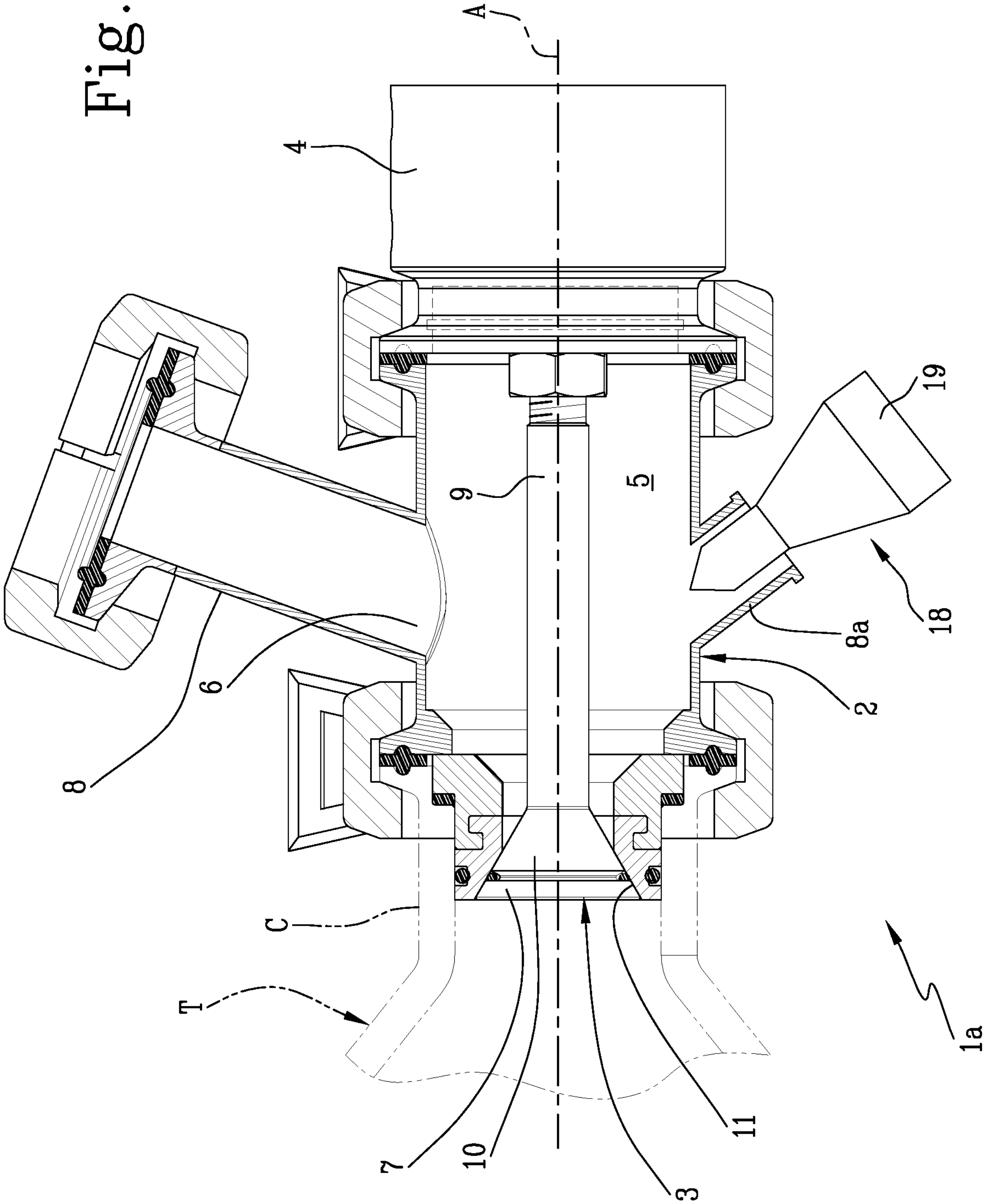

Further characteristics and advantages of the present invention will become more apparent from the illustrative, yet non-limiting, description of a preferred, albeit not exclusive, embodiment of an apparatus and relative process for the conditioning of granules, powders and/or liquids, as illustrated in the appended figures, in which:

FIG. 1 shows a schematic view of an apparatus for the conditioning of granules, powders and/or liquids, integrated with a pneumatic mixer and according to the present invention; and FIG. 2 is a longitudinal section of a constructive detail of the pneumatic mixer with which the apparatus according to the present invention is integrated.

With reference to the appended figures, reference number 1 globally indicates an apparatus for the conditioning of granules, powders and/or liquids according to the present invention.

It should be specified that the present invention finds advantageous application for the conditioning of any type of material, preferably in granular or powder form, which must undergo a conditioning treatment of various kinds. It should also be specified that the term conditioning indicates any type of treatment that is able to cause chemical/physical changes to the granules or powders.

In particular, the apparatus 1 (better illustrated in FIG. 1) comprises a hopper “T” for containing granules, powders and/or liquids.

The hopper “T” is equipped, on an external surface thereof, with at least one manifold defining a respective duct “C” in fluid communication with the inside of the hopper.

The hopper "T" preferably has a downwardly converging shape and is adapted to receive the material to be mixed from an opening at the top "T1" and deliver it from a controlled opening hole "T2" at the bottom.

The apparatus further comprises at least one blower member 1*a* associated with the duct "C" for delivering a flow of mixing gas of the granules, powders and/or liquids inside the hopper "T".

Referring only to FIG. 2, the main components of the member 1*a* are: a hollow element 2, a shutter 3 and an actuator 4 associated with the shutter 3 to adjust the position thereof, that is, to adjust the maximum stroke thereof, understood as moving from a closed condition of the shutter to a maximum opening position that can be predefined, as better specified below.

The hollow element 2, preferably with a monolithic structure, is a body internally defining a manoeuvring volume for the housing of the shutter 3 and the passage of the mixing gas flow. In particular, the hollow element 2 defines therein a duct 5 configured to pass a flow of gas or other inert gases between an inlet section 6 and an outlet section 7.

The shutter 3 is contained in the body 2 to move along a translation axis "A" thereof.

The blower member 1*a* further comprises a lateral supply duct 8 which defines the inlet section 6 and flows into the chamber 5 in a direction preferably incident to the translation axis "A" of the shutter 3.

The chamber 5 extends between a rear region of the hollow element 2, to which the actuator 4 is applied, and the aforementioned outlet section 7.

With reference to the shutter 3, it has the shape of a plunger comprising an elongated stem 9 and a flared or tapered head portion 10, preferably frusto-conical. The shutter 3 is connectable to the actuator 4 and is positionable with the controlled interruption of the gas flow through the outlet section 7.

In particular, a stop element 11, having at least one internal stop surface, is arranged in opposition to the shutter 3. The internal stop surface, preferably frusto-conical or converging, is counter-shaped to the head portion 10 of the shutter 3 to define at least one hermetically sealing configuration of the outlet section 7.

The position of the shutter 3, controlled by the actuator 4, determines the opening and closing of a flow connection between the chamber 5 and the hopper "T" to which the blower member 1*a* is connected through said duct "C". In addition, the possible intermediate positions of the shutter 3 may determine the size of the flow connection passage section. In particular, the size of the aforementioned section is defined by the position of the head portion 10 of the shutter 3 with respect to the internal stop surface.

Advantageously, in order to be able to determine the intermediate positions of the shutter 3, i.e. the shutter stroke during the opening step, adjustment means are arranged inside the actuator 4 adapted to determine the amplitude of the output section 7.

Such adjustment means may be of a manual type, for a variation of the output section 7 carried out by manual intervention on mechanical parts of the actuator 4, or automatic by means of an appropriate electronic system that intervenes on the actuator 4 under certain conditions.

The adjustment means therefore allow to control the flow with an "additional" parameter with respect to the ON/OFF pressure and time parameters only (opening and closing of the outlet section 7), i.e. a representative control parameter representing the amplitude of the fluid passage section.

Advantageously, this parameter is then controlled (as it is adjusted by manual or automatic intervention) independently of the pressure and opening time parameters of the outlet section 7.

The adjustment means therefore allow to intervene on the parameter representing the amplitude of the passage section by optimizing the flow and adjusting it according to the type of material to be mixed, i.e. according to the chemical nature of the material and the particle size of the powders.

Thus, based on each individual mixing step, the individual flow control parameters are suitably independently adjusted in order to optimally mix the powders.

The respective shapes of the head portion 10 of the shutter 3 and the internal stop surface and the position of the shutter 3 may determine the characteristics of the flow of air flowing into the hopper "T" through the duct "C".

According to a preferred embodiment of the invention, the apparatus 1 comprises a plurality of blowing members 1*a* of the type described above and associated along a circumferential path at the base of the hopper "T".

In this way, a series of pulsed mixing gas flows are generated according to a predefined sequence in order to implement a turbulent action adapted to homogeneously mix the granules, powders/liquids contained in the hopper "T".

The apparatus 1 further comprises a first member 12 for conditioning the flow of mixing gas arranged upstream of each blower member 1*a* to adjust at least the pressure and/or humidity and/or temperature values and/or to supply the flow with an additive in a liquid or gaseous or vaporous form.

In particular, the first conditioning member 12 provides for conditioning the granules, powders/liquids in the hopper "T" by conditioning the gas flow generated by the member 1*a*.

In greater detail, with reference to FIG. 1 schematically illustrating the apparatus 1, the first conditioning member 12 comprises a supply line 13 connecting a supply source 14 of the pressurized flow to each blower member 1*a*.

In this situation, the hollow element 2 can be connected to the supply line 13 by means of the lateral duct 8. This duct has the function of establishing a flow connection between the supply source 14 under pressure and the chamber 5.

The first conditioning member 12 further comprises: a drying unit 15 of the flow arranged downstream of the supply source 14, and/or a heating unit 16 of the flow arranged downstream of the drying unit 15, and/or an injection member 17 of said additive interposed between the heating unit 16 and the blower member 1*a*.

In this way, it is possible to condition the mixing flow by supplying it at a predetermined pressure, in addition or alternatively at a predetermined temperature, in addition or alternatively at a predetermined moisture value, in addition or alternatively by distributing an additive to the flow itself. The conditioned mixing flow therefore also determines the conditioning of the material contained in the hopper "T" and favoured by the mixing action implemented by the flow itself.

The apparatus can further comprise a second member 18 for conditioning the flow of mixing gas engaged to each blower member 1*a* for injecting an additive in a liquid or gaseous or vaporous form directly inside the blower member 1*a* itself.

In greater detail, as better illustrated in FIG. 2, the second conditioning member 18 comprises at least one additive supply nozzle 19. The nozzle 19 is engaged in an auxiliary duct 8*a* of the hollow element 2 extending from the opposite side of the lateral duct 8 and in an incident direction to the translation axis "A" of said shutter.

The second conditioning member 18 further comprises a supply source (not shown) of the additive connected to the nozzle 19 to supply the additive into the chamber 5.

In this way, the additive is supplied directly to the blower member from the nozzle 19 and conveyed into the hopper "T" by the mixing flow. Advantageously, the atomisation of the additive in liquid form occurs from the encounter of the additive itself with the mixing flow.

The presence of the additive dispensed by the nozzle 19 may be in addition to the conditioning of the first member 12 or alternatively, as a function of the various conditioning needs of the material in the hopper "T". For example, two different additives supplied respectively by the nozzle 19 and the flow may be provided for a specific treatment. Such additives may be of various nature such as for example chemical compounds or simply powder humidifying agents.

The apparatus 1 may further comprise a third member 20 for conditioning the environment inside the hopper "T" associated with the hopper "T" itself to adjust at least the temperature values and/or to supply an additive in an atomised liquid form or in a gaseous or vaporous form inside the hopper.

In this case, the conditioning does not take place through the mixing fluid but directly in the hopper "T".

Preferably, the third conditioning member 20 comprises a heating and/or cooling member 21 associated with the hopper "T" for adjusting the temperature of the environment inside the hopper itself, and/or at least one nozzle 22 for supplying the additive engaged in an upper area of the hopper "T" (FIG. 1).

In this manner, the additive is distributed above the granules, powders and/or liquids contained in the hopper. Advantageously, the injection of the pressurized gas allows the control of microbiological aspects. In fact, in this way the bacterial load and the presence of microorganisms is reduced, stationing the pressurized gas inside the hopper for a predetermined time.

The apparatus 1 can also comprise a fourth member 23 for conditioning the environment inside the hopper "T" to adjust the pressure values inside the hopper itself.

The fourth member 23 for conditioning comprises: a first duct 24 in fluid communication with the inside of the hopper "T" and provided with a valve 24*a* operable to determine a condition of use of the hopper at atmospheric pressure. The fourth member 23 further comprises a second duct 25 in fluid communication with the inside of the hopper "T" and provided with a valve 25*a* operable to determine a condition of use of the hopper under vacuum or under pressure.

More specifically, the second duct 25 extends between the hopper "T" and a compression or vacuum device 26. Preferably, a compensation tank 27 and a condensation unit 28 are further provided along the second duct 25 and between the device 26 and the valve 25*a*.

Advantageously, the valves 24*a*, 25*a* of the first and second duct 24, 25 are coordinated with each other to switch the fourth conditioning member 23 between an atmospheric pressure condition in the hopper "T" and a vacuum/compression condition in the hopper "T".

The present invention also relates to a process for the conditioning of granules, powders and/or liquids, which comprises the steps of:

supplying the granules, powders and/or liquids inside the hopper "T";

mixing the granules, powders and/or liquids by delivering at least one flow of mixing gas inside the hopper "T"; and conditioning the gas flow during the step of mixing the granules, powders and/or liquids.

The step of conditioning the gas flow is carried out by adjusting at least the pressure and/or humidity and/or temperature values and/or supplying the flow with the additive in a liquid or gaseous or vaporous form.

As specified above, the step of mixing the granules, powders and/or liquids is determined by pulsed gas flows inside the hopper "T" generated by the respective blower members 1*a*. In this case, the step of conditioning the gas flow is carried out upstream of each blower member 1*a*.

In addition or alternatively, the process can comprise a second step of conditioning the flow of mixing gas carried out by injecting an additive in a liquid or gaseous or vaporous form inside the blower member 1*a*. In this case, the additive is mixed with the gas flow already conditioned upstream of the blower member 1*a*.

In addition or alternatively, the process may comprise a third step of conditioning the environment inside the hopper "T" carried out by adjusting at least the temperature values and/or supplying an additive in an atomised liquid form or in a gaseous or vaporous form inside the hopper.

In this case, the step of supplying an additive inside the hopper is carried out by distributing the additive on the granules, powders and/or liquids contained in the hopper, preventing the additive from being distributed by the mixing gas flow.

Again, in addition or alternatively to what is specified above, the process can further comprise a fourth step for conditioning the environment inside the hopper "T" by adjusting the pressure values inside the hopper "T" itself.

In this case, an atmospheric pressure condition in the hopper "T" or a vacuum or compression condition in the hopper "T" is set.

Each of the conditioning steps therefore involves a specific treatment of the material in the hopper "T".

Note that the apparatus 1 and the process described above is extremely versatile as it is able to implement different conditioning actions to different materials of different nature. Such conditioning actions are determined by the aforementioned members, each able to set at least one conditioning parameter that can be for supplying an additive, adjusting pressures, temperatures and humidity.

Therefore, the timing of the conditioning operations is significantly reduced, without compromising the operations themselves and the result of the final product.

In addition, combining the conditioning apparatus with the mixing action allows the chemical/physical structure of the material to be modified homogeneously, keeping the material in optimal production conditions.

In fact, it should be noted that the combined conditioning and mixing action inside the hopper results in the formation of a more homogeneous powder-gas mixture, as each individual powder particle comes into better contact with the conditioning fluid.

In addition, there is less degradation of solid particles (powder) due to the absence of friction between powder and mechanical member.

The invention claimed is:

1. An apparatus for the conditioning of granules, powders and/or liquids, the apparatus comprising:

a hopper for containing granules, powders and/or liquids, including, on an external surface thereof, at least one manifold defining a respective duct in fluid communication with an inside of said hopper;

at least one blower member operatively connected with said duct for delivering a flow of mixing gas to the granules, powders and/or liquids inside the hopper;

a first conditioning member for conditioning the flow of mixing gas, the first conditioning member arranged upstream of said at least one blower member to supply the flow of mixing gas to the at least one blower member and to regulate values of at least the pressure and/or humidity and/or temperature and/or to supply the flow of mixing gas with a first additive in a liquid or gaseous or vaporous form;

wherein said at least one blower member comprises:

a hollow element internally defining a duct, extending between an inlet section and an outlet section, for passage of the flow of mixing gas between said inlet and outlet sections;

a shutter arranged for a controlled interruption of said flow of mixing gas through said outlet section, said shutter having a translation axis;

wherein said hollow element also has a lateral supply duct extending from said inlet section in a first incident direction to the translation axis of said shutter and an auxiliary duct extending from a side of the hollow element opposite from the lateral supply duct and in a second incident direction to the translation axis of said shutter;

a second conditioning member for conditioning the flow of mixing gas connected to said at least one blower member for injecting a further additive in a liquid or gaseous or vaporous form inside the at least one blower member; and wherein said second conditioning member comprises at least one nozzle for supplying the further additive connected to the auxiliary duct.

2. The apparatus according to claim 1, wherein said first conditioning member comprises a supply line which connects a supply source of the mixing gas to said at least one blower member; said first conditioning member further comprising:

a drying unit of the flow arranged downstream of the supply source, and a heating unit of the flow arranged downstream of the drying unit, and an injection member of said additive interposed between the heating unit and the at least one blower member.

3. The apparatus according to claim 1, wherein said first conditioning member comprises a supply line which connects a supply source of the mixing gas to said at least one blower member;

wherein said at least one blower member comprises:

wherein said inlet section is connectable to said supply line and said outlet section is connectable to the at least one manifold; and an actuator operatively connected with the shutter and configured to adjust a position of said shutter corresponding to a width of the outlet section.

4. The apparatus according to claim 3, wherein the shutter is shaped as a plunger with a frusto-conical head portion and a stem extending from said head portion towards the actuator.

5. The apparatus according to claim 3, wherein the hollow element is a monolithic block extending between said inlet section and said outlet section, wherein said inlet and outlet sections are arranged in mutually opposite positions along the translation axis of said shutter.

6. The apparatus according to claim 1, wherein said second conditioning member further comprises a source for supplying said further additive connected to said nozzle to supply the further additive inside the duct defined by the hollow element.

7. The apparatus according to claim 1, and further comprising a third conditioning member for conditioning an environment inside the hopper and operatively connected with the hopper to adjust the value of at least the temperature and/or to supply a yet further additive in an atomized liquid form or in a gaseous or vaporous form inside the hopper.

8. The apparatus according to claim 7, wherein said third conditioning member comprises a heating and/or cooling member operatively connected with said hopper for adjusting the temperature inside the hopper, and/or at least a nozzle for supplying the yet further additive positioned in an upper area of the hopper to distribute said yet further additive on the granules, powders and/or liquids contained in the hopper.

9. The apparatus according to claim 1, and further comprising a further conditioning member for conditioning an environment inside the hopper to adjust the value of the pressure inside the hopper.

10. The apparatus according to claim 9, wherein said further conditioning member comprises:

a first communication duct in fluid communication with the inside of the hopper and including a valve operable to determine a condition of use of the hopper at atmospheric pressure; and a second communication duct in fluid communication with the inside of the hopper and including a valve operable to determine a condition of use of the hopper under vacuum or under pressure.

11. The apparatus according to claim 10, wherein said second communication duct extends between the hopper and a compression or vacuum device; said valves of the first and second communication ducts being coordinated with each other to switch the further conditioning member between an atmospheric pressure condition in the hopper and a vacuum/compression condition in the hopper.

12. An apparatus for the conditioning of granules, powders and/or liquids, the apparatus comprising:

a hopper for containing granules, powders and/or liquids, including, on an external surface thereof, at least one manifold defining a respective duct in fluid communication with an inside of said hopper;

at least one blower member operatively connected with said duct for delivering a flow of mixing gas to the granules, powders and/or liquids inside the hopper;

a first conditioning member for conditioning the flow of mixing gas, the first conditioning member arranged upstream of said at least one blower member to supply the flow of mixing gas to the at least one blower member and to regulate values of at least the pressure and/or humidity and/or temperature and/or to supply the flow of mixing gas with an additive in a liquid or gaseous or vaporous form;

wherein said first conditioning member comprises a supply line which connects a supply source of the mixing gas to said at least one blower member;

wherein said at least one blower member comprises:

a hollow element internally defining a duct, extending between an inlet section and an outlet section, for the passage of the gas flow between said sections, wherein said inlet section is connectable to said supply line and said outlet section is connectable to the at least one manifold;

a shutter arranged for a controlled interruption of said flow of mixing gas through said outlet section;

an actuator operatively connected with the shutter and configured to adjust the position of said shutter corresponding to a width of the outlet section;

wherein the hollow element is a monolithic block extending between said inlet section and said outlet section, wherein said inlet and outlet sections are arranged in mutually opposite positions along a translation axis of said shutter, and wherein said hollow element also has a lateral supply duct extending from said inlet section in an incident direction to the translation axis of said shutter.

13. An apparatus for the conditioning of granules, powders and/or liquids, the apparatus comprising:

a hopper for containing granules, powders and/or liquids, including, on an external surface thereof, at least one manifold defining a respective duct in fluid communication with an inside of said hopper;

at least one blower member operatively connected with said duct for delivering a flow of mixing gas to the granules, powders and/or liquids inside the hopper;

a first conditioning member for conditioning the flow of mixing gas, the first conditioning member arranged upstream of said at least one blower member to supply the flow of mixing gas to the at least one blower member and to regulate values of at least the pressure and/or humidity and/or temperature and/or to supply the flow of mixing gas with an additive in a liquid or gaseous or vaporous form;

a further conditioning member for conditioning an environment inside the hopper to adjust the value of the pressure inside the hopper;

wherein said further conditioning member comprises:

a first communication duct in fluid communication with the inside of the hopper and including a valve operable to determine a condition of use of the hopper at atmospheric pressure; and a second communication duct in fluid communication with the inside of the hopper and including a valve operable to determine a condition of use of the hopper under vacuum or under pressure.

14. The apparatus according to claim 13, wherein said second communication duct extends between the hopper and a compression or vacuum device; said valves of the first and second communication ducts being coordinated with each other to switch the further conditioning member between an atmospheric pressure condition in the hopper and a vacuum/compression condition in the hopper.

* * * * *